United States Patent
Echevarria Vallespi et al.

(10) Patent No.: US 11,580,669 B2
(45) Date of Patent: Feb. 14, 2023

(54) CONTEXT-AWARE TEXT COLOR RECOMMENDATION SYSTEM

(71) Applicant: Adobe Inc., San Jose, CA (US)

(72) Inventors: Jose Ignacio Echevarria Vallespi, South San Francisco, CA (US); Shikhar Garg, New Delhi (IN); Saikat Chakrabarty, Uttar Pradesh (IN); Nirmal Kumawat, Rajasthan (IN)

(73) Assignee: Adobe Inc., San Jose, CA (US)

(*) Notice: Subject to any disclaimer, the term of this patent is extended or adjusted under 35 U.S.C. 154(b) by 73 days.

(21) Appl. No.: 17/093,060

(22) Filed: Nov. 9, 2020

(65) Prior Publication Data
US 2022/0148227 A1 May 12, 2022

(51) Int. Cl.
*G06T 7/90* (2017.01)
*G06T 11/00* (2006.01)
*G06V 10/56* (2022.01)
*G06V 10/60* (2022.01)

(52) U.S. Cl.
CPC .............. *G06T 7/90* (2017.01); *G06T 11/001* (2013.01); *G06V 10/56* (2022.01); *G06V 10/60* (2022.01)

(58) Field of Classification Search
CPC ......... G06T 7/90; G06T 11/001; G06V 10/56; G06V 10/60
USPC .......................................................... 382/162
See application file for complete search history.

(56) References Cited

U.S. PATENT DOCUMENTS

| | | | |
|---|---|---|---|
| 5,113,251 A * | 5/1992 | Ichiyanagi | H04N 1/58 358/453 |
| 2011/0074807 A1* | 3/2011 | Inada | G06T 11/001 345/589 |
| 2016/0275067 A1* | 9/2016 | Mei | G06F 40/106 |
| 2019/0130606 A1* | 5/2019 | Walsh | G06V 10/56 |
| 2020/0159870 A1* | 5/2020 | Bowen | G06F 3/0482 |
| 2020/0159871 A1* | 5/2020 | Bowen | G06T 11/001 |

* cited by examiner

*Primary Examiner* — Ali Bayat
(74) *Attorney, Agent, or Firm* — Nicholson De Vos Webster & Elliott LLP

(57) ABSTRACT

Embodiments are disclosed for determining a context-aware text color recommendation for text at a text location on an image. In particular, in one or more embodiments, the disclosed systems and methods comprise obtaining an image and a text location on the image, identifying at least one color theme based on a color harmonic template associated with the image, modifying the at least one color theme based on characteristics of the image, determining accessibility for at least one color in the at least one color theme based on the text location on the image, and determining a color palette recommendation for text at the text location on the image based on the determined accessibility for the at least one color in the at least one color theme.

20 Claims, 10 Drawing Sheets

CONTEXT-AWARE TEXT COLOR RECOMMENDATION SYSTEM

BACKGROUND

Conventional computer graphic editing systems enable users to create or manipulate images interactively on a computer. A very common task in these conventional computer graphic editing systems is the composition of text over a background image. Among the many aspects of the text to consider are location and color. For example, finding an aesthetically pleasing color for the text that is appropriate for the background image, while being accessible (e.g., easy for a reader to read) can often be important factors to achieving a successful composition.

Some existing solutions are able to model objective and/or personalized aesthetic preferences, to improve the appeal of arbitrary color themes, or recommend new colors to add to a theme. However, these solutions are typically based only on aesthetics and do not consider accessibility nor contextual spatial constraints, with their context being only the color theme itself. Other existing solutions focus on data visualizations, where there are rarely existing colors, and thus have the freedom to determine any color theme.

These and other problems exist with regard to composition of text over a background image.

SUMMARY

Introduced here are techniques/technologies for determining font colors for text, given the text's placement over a given background image, that both aesthetically match the given background image, while achieving sufficient contrast to make the text accessible (e.g., easily readable). To address the aesthetics stage, a context-aware text color recommendation system can use a curated database of color palettes and identify the color palettes that best match an input image. To address the accessibility stage, the context-aware text color recommendation system can identify the colors in the identified color palettes that are able to achieve at least a target contrast ratio with respect to a given text location on the given background image.

In particular, in one or more embodiments, the disclosed systems and methods may include obtaining an image and a text location on the image from a user. An image color analysis of the image is generated that indicates the distribution of colors in the image. Using the image color analysis, a color harmonic template associated with the image can be determined. A plurality of color themes is filtered using the determined color harmonic template to identify a plurality of filtered color themes. Some or all of the plurality of filtered color themes are then modified by rotating the primary angles of the plurality of filtered color themes to match the angle of the primary axis of the image. The plurality of filtered color themes are then sorted based on the amount of rotation required, and a subset having the least rotation can be selected as color themes that most aesthetically match the image. Using the text location, the accessibility of the colors from the most aesthetic color themes can be determined, with the most accessible colors being chosen as colors for a color palette recommendation that can be outputted to a computing device.

In some embodiments, determining the accessibility for each color in the plurality of filtered color themes includes computing a luminance of the image at the text location and computing a luminance for each color, individually in the plurality of filtered color themes. The luminance of each color can then be compared with the luminance of the image at the text location to determine a contrast ratio for each color. Colors for the color palette recommendation can then be selected from the colors have contrast ratios above a target contrast ratio.

In some embodiments, an updated text location on the image can be received. For example, via user selection of an updated text selection or an action that causes the movement of text from the text location to an updated text location. The accessibility of the colors from the most aesthetic color themes can then be determined for the updated text location, with a new color palette recommendation based on the contrast ratios between the luminance of colors in the most aesthetic color themes and the luminance of the updated text location.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a context-aware text color recommendation system that provides color recommendations for text over a background image. When placing text over a background image, it is important to consider how the color of the text will complement the background image. For example, colors at opposite sides of a color wheel are complimentary and can produce a high contrast. For automatic algorithms, however, determining colors for text at a particular text location on an image that are both aesthetically pleasing and accessible can be a particularly challenging task.

To address these issues, the context-aware text color recommendation system performs a two-stage process: an aesthetics stage and an accessibility stage. In the aesthetics stage, the context-aware text color recommendation system focuses on identifying aesthetic color themes compatible with the color distribution from a received image. In the accessibility stage, the context-aware text color recommendation system uses a provided location for text on the received image to identify colors within the aesthetic color themes that have contrast ratios with the location for text on the received image that are above a target contrast ratio (e.g., easy to read).

Figure 1:
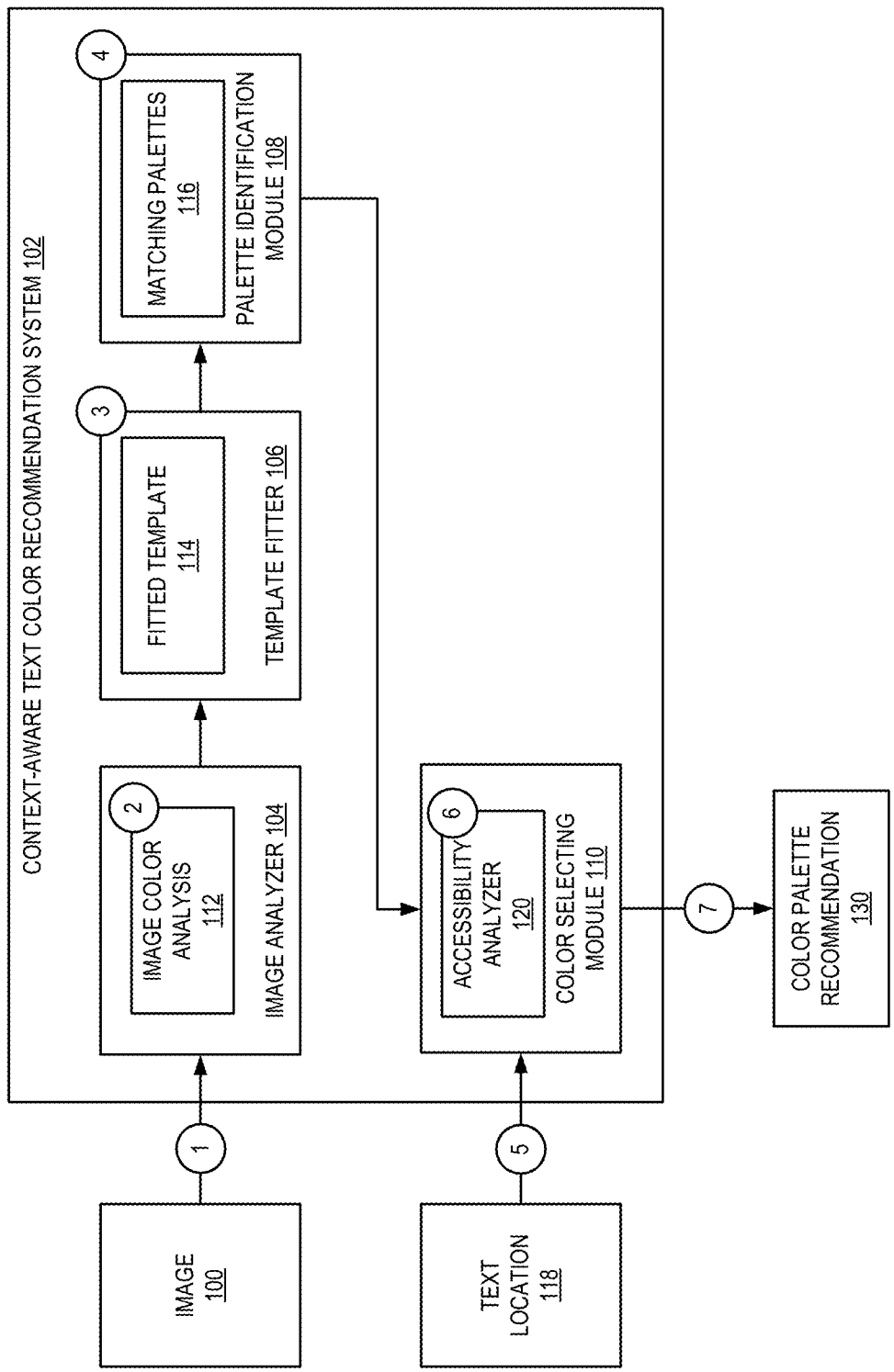
FIG. 1 illustrates a diagram of a process of determining a context-aware text color recommendation in accordance with one or more embodiments.

FIG. 1 illustrates a diagram of a process of determining a context-aware text color recommendation in accordance with one or more embodiments. As shown in FIG. 1, in one or more embodiments, a context-aware text color recommendation system 102 receives an image 100, as shown at numeral 1. For example, the context-aware text color recommendation system 102 receives the image 100 from a user via a computing device. In one example, a user may select an image in a document processing application or an image processing application. In another example, a user may submit an image to a web service or an application configured to receive images as inputs. The image 100 may be any type of digital visual media.

In one or more embodiments, the context-aware text color recommendation system 102 includes an image analyzer 104 that receives the image 100. In one or more embodiments, the image analyzer 104 generates an image color analysis 112 from the received image 100, as shown at numeral 2. In one or more embodiments, the image analyzer 104 analyzes the image 100 and generates the image color analysis 112 in the form of a 3D histogram. In one or more embodiments, a 3D histogram is a representation of the distribution of colors in the image 100. For example, a 3D histogram for a digital image can be a three-dimensional representation of the number of pixels in the image corresponding to a color or range of colors. In one or more alternatives embodiments, instead of generating a 3D histogram, the image analyzer 104 analyzes the image 100 and generates the image color analysis 112 in the form of a color palette. In one or more embodiments, the color palette includes the X most frequently used colors in the image 100. In some embodiments, the color palette includes however many colors are above a defined frequency threshold. In one or more embodiments, the context-aware text color recommendation system 102 determines whether to generate a 3D histogram or a color palette as part of the image color analysis 112 based on a computing device type, an application type, available computing resources, etc. In one or more embodiments, the image analyzer 104 then passes the image color analysis 112 to a template fitter 106.

In one or more embodiments, the template fitter 106 determines a fitted template 114 for the image 100, as shown at numeral 3. In one or more embodiments, the template fitter 106 compares the image color analysis 112 of the image 100 against a plurality of harmonic templates. In one embodiment, the template fitter 106 distinguishes between at least the following harmonic templates: monochromatic, analogous, complementary, single split, triadic, double split and square. In other embodiments, template fitter 106 distinguishes between a greater or a fewer number of harmonic templates. In one or more embodiments, the template fitter 106 determines the fitted template 114 as being the harmonic template that best matches the color distribution in the image color analysis 112 of the image 100.

As shown in FIG. 1, the context-aware text color recommendation system 102 can include a palette identification module 108 that determines matching palettes 116, as shown at numeral 4. For example, the palette identification module 108 receives the fitted template 114 from template fitter 106 and determines matching palettes 116. To determine matching templates 116, the palette identification module 108 first retrieves a plurality of color themes. Each of the color themes can be a color palette. In one embodiment, each color palette includes five colors. In other embodiments, each color palette can include a greater or fewer number of colors. While in one embodiment, the palette identification module 108 retrieves 1000 color themes, in other embodiments, a greater or a fewer number of color themes are retrieved. In one or more embodiment, the palette identification module 108 then filters the retrieved color themes based on the fitted template 114 of image 100. For example, if the fitted template 114 of image 100 is analogous, the palette identification module 108 filters out any colors themes that are not of the analogous type.

After filtering the color themes based on the fitted template 114 of image 100, the palette identification module 108 then, if not already matching, rotates the primary axis of the filtered color themes to match the primary axis of the image 100, e.g., determined based on fitted template determined using the image color analysis 112 of the image 100. The palette identification module 108 can then calculate the amount of rotation performed for each filtered color theme, and then sort the filtered color themes in order based on the amount of rotation of the primary axis. In one or more embodiments, where the fitted template 114 does not contain a wide variation in hues (e.g., when the fitted template 114 is analogous or monochrome), the palette identification module 108 can repeat this process by determining color themes based on rotation from the complementary color axis (180 degrees from the primary axis of the image 100) and/or the accent color axis (90 degrees from the primary axis of the image 100). In such embodiments, the palette identification module 108 can calculate the amount of rotation for each of the analogous or monochromatic templates based on the amount of rotation from their corresponding axis. The analogous or monochromatic templates can then be sorted with the other matching templates. In one or more embodiments, the palette identification module 108 selects some or all of the sorted color themes as the matching palettes 116 and sends the matching palettes 116 to a color selecting module 110.

At numeral 5, the context-aware text color recommendation system 102 receives a text location 118 for text on the image 100. For example, the context-aware text color recommendation system 102 receives the text location 118 from a user via a computing device. In one example, a user may select the text location 118 by selecting a location or portion of the image 100 in a document processing application or an image processing application. In one or more embodiments, the text location 118 can be a cursor location on the image 100 at which the text is to be entered, a bounding box with a selected dimensions that is to contain the text, etc. In one or more embodiments, the color selecting module 110 receives the text location 118.

In one or more embodiments, the color selecting module 110 generates a palette recommendation 130 using the received text location 128 and the matching palettes 116, as shown at numeral 6. Web Content Accessibility Guidelines (WCAG) relates the readability of text with the contrast ratio between text color and the immediate region of the image 100 in which a bounding box containing the text is located. The contrast ratio can be defined as:

$$C(L_1, L_2) = \frac{L_1 + 0.05}{L_2 + 0.05}$$

where $L_1$ is the relative luminance of the lighter of the colors of the text and the image, and $L_2$ is the relative luminance of the darker of the colors of the text and the image.

In one or more embodiment, an accessibility analyzer 120 in the color selecting module 110 computes the luminance of the background portion that falls inside a bounding box for the text, $L_{avg}$. In one or more embodiments, $L_{avg}$ is the average luminance for the bounding box, calculated by determining the luminance of each individual pixel of the image 100 within the bounding box. The accessibility analyzer 120 then computes $C(L_{avg}, L_i)$ for each color in each palette from the sorted color themes in the matching palettes 116.

The computed contrast ratio can then be compared to a target contrast ratio. In one or more embodiments, typical target contrast ratio target, based on WCAG, can include A=3, AA=4.5, and AAA=7. For example, a contrast ratio of "3" indicates that one of the colors is three times lighter or darker than the other color. In some embodiments, contrast ratio targets can be any value between 1 and 21. In one or more embodiments, the target contrast ratio target can be a user-specified value.

In one embodiment, if the resulting contrast ratio is above a target threshold, it indicates that the contrast is sufficient to ensure accessibility (e.g., readability of the text at the selected text location). In such occurrences, the color is added to a list of valid colors. If the resulting contrast ratio is below the user specified target threshold, the color is discarded. In one embodiment, to provide more variations in color selection, the accessibility analyzer 120 retrieves the first M colors, and finds K clusters using K-means clustering, where the value of K is based on the number of color recommendations to be presented to the user. In one or more embodiments, the accessibility analyzer 120 selects the centroid of each of the K clusters. In some embodiments, the value of K is ten, but in other embodiments, the value of K is can be greater or smaller.

At numeral 7, the context-aware text color recommendation system 102 can return the color palette recommendation 130 to the user. After the process described above in numerals 1-6, the color palette recommendation contains colors that both aesthetically match the colors of the image 100, in addition to having enough contrast with the location on the image to be accessible. In one or more embodiment, the color palette recommendation 130 is sent to the user or computing device that initiated the process with the context-aware text color recommendation system 102.

In one or more alternative embodiments, instead of determining the average luminance of the portion of the image 100 that falls inside a bounding box for the text, the context-aware text color recommendation system 102 inserts a solid color plate over the image 100 at the text location 118. For example, if the image 100 at the text location 118 includes a large amount of textures, the context-aware text color recommendation system 102 can suggest one or more colors for a solid color plate for placement on the image 100 to accommodate text. In one or more embodiments, the context-aware text color recommendation system 102 determines that the image 100 at the text location 118 includes a large amount of textures by measuring the standard deviation of the luminance of the pixels inside the bounding box. If the standard deviation if greater than a threshold, the context-aware text color recommendation system 102 can automatically insert the solid color plate, or display a notification recommending the user to manually select or create the solid color plate. In another embodiment, the context-aware text color recommendation system 102 determines the amount of texture by analyzing the pixels inside the bounding box in the frequency domain. In the frequency domain, the existence of high frequencies above a threshold could trigger the automatic addition or recommendation of a solid color plate.

In such embodiments, the context-aware text color recommendation system 102 can determine one or more plate color recommendations that have an acceptable contrast ratio (e.g., above a first contrast ratio target threshold) with the image 100 at the text location 118. Further, the context-aware text color recommendation system 102 can then determine colors for the color palette recommendation 130 that have an acceptable contrast ratio (e.g., above a second contrast ratio target threshold) with the selected color for the solid color plate.

In another embodiment, the context-aware text color recommendation system 102 first determines the color palette recommendation 130, as described above, and then determines one or more plate color recommendations that have an acceptable contrast ratio with either the colors in the color palette recommendation 130 or a selected color from the color palette recommendation 130. This solution can provide plate color recommendations that are compatible both with the image 100 and the selected color for the text.

In one or more alternative embodiments, instead of retrieving the plurality of color themes from a database or storage manager, the palette identification module 108 can dynamically generate the plurality of color themes. For example, using the fitted template 114 that identifies a type of harmonic template most closely matching the color distribution of the image 100, the palette identification module 108 can sample colors along the axes of the fitted template 114. In such embodiments, the palette fitting, filtering, alignment, and ordering can be bypassed, as the sampled colors closely match the harmonic template of the fitted template 114. For example, after colors are sampled along one of the axes of the fitted template 114, the accessibility of the color can be determined (e.g., by determining the color's contrast ratio to the text location 118).

Figure 2:
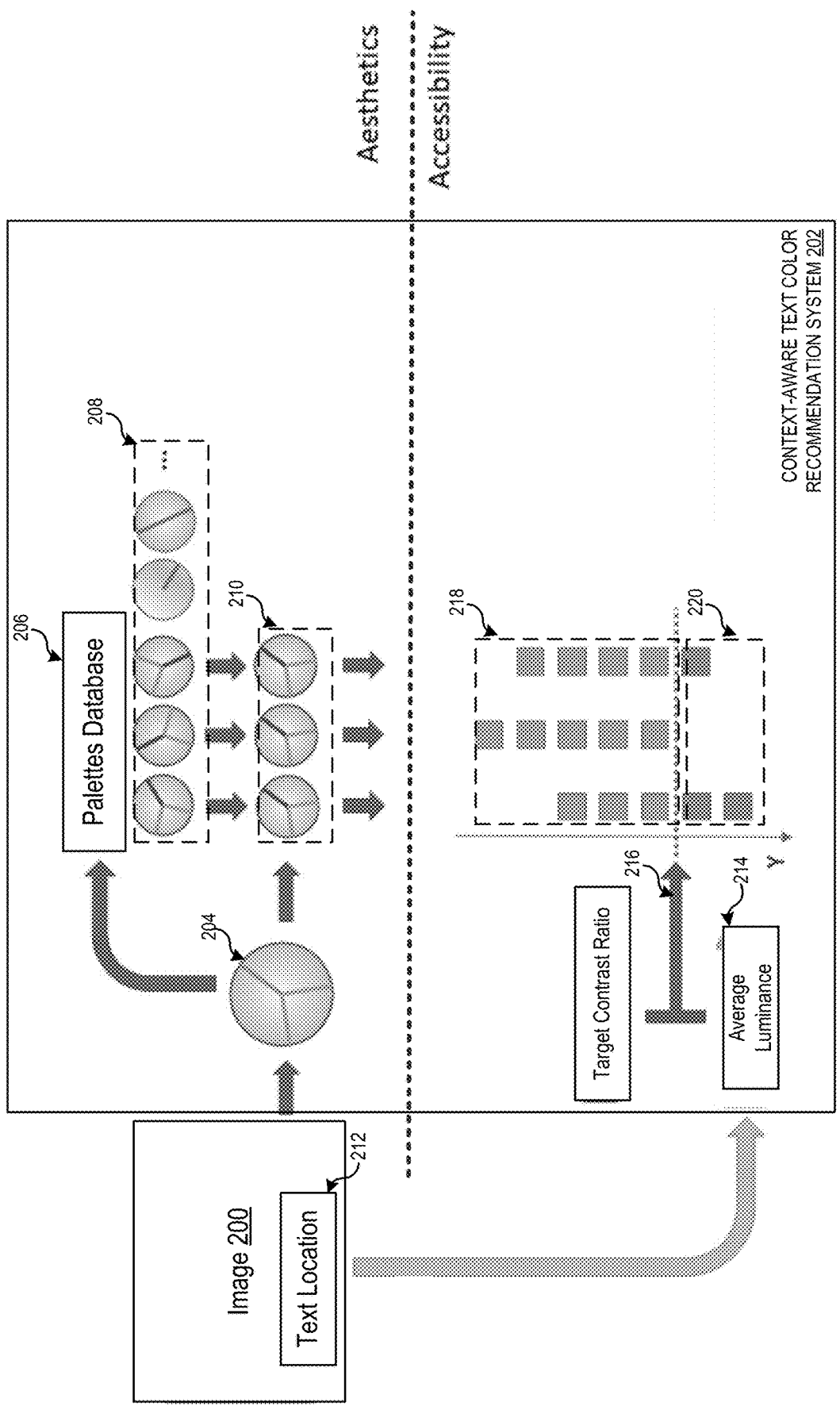
FIG. 2 illustrates a diagram of a process of determining a context-aware text color recommendation in accordance with one or more embodiments.

FIG. 2 illustrates a diagram of a process of determining a context-aware text color recommendation in accordance with one or more embodiments. In one or more embodiments, the process of a context-aware text color recommendation system 202 determining a color palette recommendation can be divided into two stages: an aesthetics stage and an accessibility stage. In such embodiments, the aesthetics stage focuses on identifying aesthetic color themes compatible with the color distribution from a received image, while the accessibility stages focuses on finding colors within those themes that have enough contrast with the local background to be accessible (e.g., easy to read).

In the aesthetics stage, the context-aware text color recommendation system 202 receives an image 200 as an input. The context-aware text color recommendation system 202 determines a fitted template 204 for the image 200. In one embodiment, the fitted template 204 for the image 200 can be one of the following harmonic templates: monochromatic, analogous, complementary, single split, triadic, double split and square. After determining the fitted template 204 for the image 200, the context-aware text color recommendation system 202 accesses a palettes database 206 to retrieve a plurality of color themes. The context-aware text color recommendation system 202 filters the plurality of color themes to identify a plurality of fitted templates 208, where the plurality of fitted templates 408 are of the same harmonic template as the fitted template 204 for the image 200. The context-aware text color recommendation system 202 can then rotate one or more of the plurality of fitted templates 208 based on the angle of the primary axis of the fitted template 204 for the image 200. In one or more embodiments, the result is a set of aligned color themes 210. In one or more embodiments, the context-aware text color recommendation system 202 can sort the color themes in the set of aligned color themes 210 based on the amount of rotation required for each color theme to match the angle of the primary axis of the fitted template 204 for the image 200.

In the accessibility stage, the context-aware text color recommendation system 202 receives a text location 212 on an image 200 as an input. In one or more embodiments, the context-aware text color recommendation system 202 receives a text location 212 when a user clicks, taps, or otherwise interacts with an underlying application. In one or more embodiments, the context-aware text color recommendation system 202 computes the average luminance 214 of the background portion that falls inside a bounding box for the text, $L_{avg}$. The context-aware text color recommendation system 202 can further compute $C(L_{avg}, L_i)$ for each color in each palette from the set of aligned color themes 210 using a contrast ratio defined as:

$$C(L_1, L_2) = \frac{L_1 + 0.05}{L_2 + 0.05}$$

where $L_1$ is the relative luminance of the lighter of the colors, and $L_2$ is the relative luminance of the darker of the colors.

In one or more embodiments, the color theme in the set of aligned color themes 210 contain five colors. In one or more embodiments, the context-aware text color recommendation system 202 compares the calculated contrast ratios for each color in each color theme in the set of aligned color themes 210 against a target contrast ratio 216. In one embodiment, if the resulting contrast ratio is above target contrast ratio 216, that color is added to a list of valid colors. If the resulting contrast ratio is below the target contrast ratio 216, the color is discarded. As illustrated in FIG. 2, the colors in box 218 have been discarded for not meeting the target contrast ratio 216. The colors in box 220 meet or exceed the target contrast ratio 216 and can be used as candidate colors for presenting to the user in a color palette.

Figure 3:
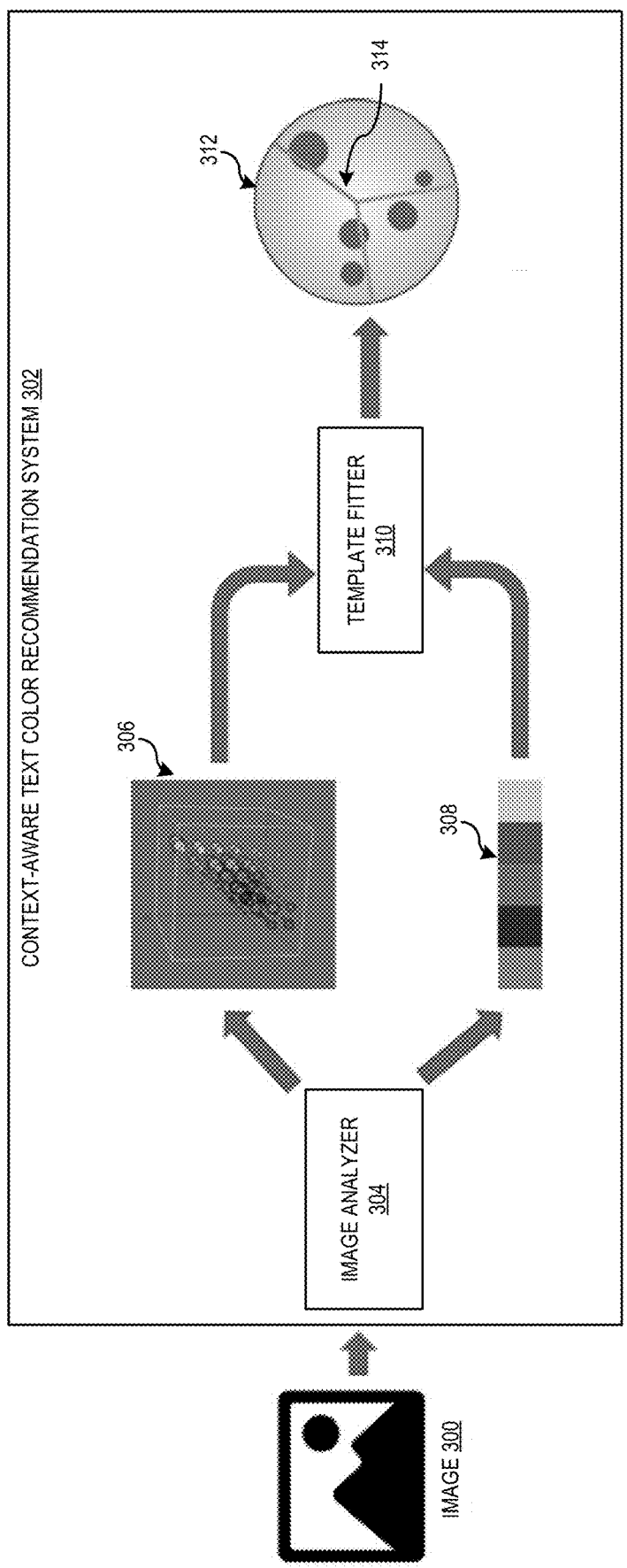
FIG. 3 illustrates a diagram of an example image analyzer and template fitter in accordance with one or more embodiments.

FIG. 3 illustrates a diagram of an example image analyzer and template fitter in accordance with one or more embodiments. In FIG. 3, a context-aware text color recommendation system 302 includes an image analyzer 304 and a template fitter 310. In other embodiments, the context-aware text color recommendation system 302 includes more or fewer modules than illustrated in FIG. 3.

As illustrated in FIG. 3, when the context-aware text color recommendation system 302 receives an image 300 as an input, the image 300 it is provided to the image analyzer 304. In one or more embodiments, the image analyzer 304 is configured to analyze the image 300 to generate a representation of the color distribution in the image 300. For example, the image analyzer 304 can generate a 3D histogram (e.g., histogram 306) or a color palette (color palette 308). In one embodiment, the determination of whether to generate a 3D histogram or a color palette is based on the image analysis performed by the image analyzer 304. For example, if a 3D histogram of the image 300 would include a large number of colors (e.g., above a threshold amount), the image analyzer 304 may determine that this would result in a slower template fitting and generate a color palette for the image 300.

After the image analyzer 304 completes the image analysis, the output (e.g., either the histogram 306 or the color palette 308) is sent to the template fitter 310. In one or more embodiments, the template fitter 310 determines a fitted template 312 for the image 300. In one or more embodiments, the template fitter 310 attempts to fit the color distribution of the image 300 against a plurality of harmonic templates. In one embodiment, the template fitter 310 distinguishes between the following harmonic templates: monochromatic, analogous, complementary, single split, triadic, double split and square. In other embodiments, template fitter 310 distinguishes between a greater or a fewer number of harmonic templates. In one or more embodiments, the template fitter 310 determines the fitted template 312 as being the harmonic template that best matches the color distribution for the image 300. In the example illustrated in FIG. 3, the template fitter 310 determined the fitted template 312 for the image 300 to be triadic.

In one or more embodiments, in addition to determining the harmonic template for the image 300, the template fitter 310 also determines a configuration for the fitted template 312 for the image 300, including its primary axis, indicated by label 314, and the angle of the primary axis.

Figure 4:
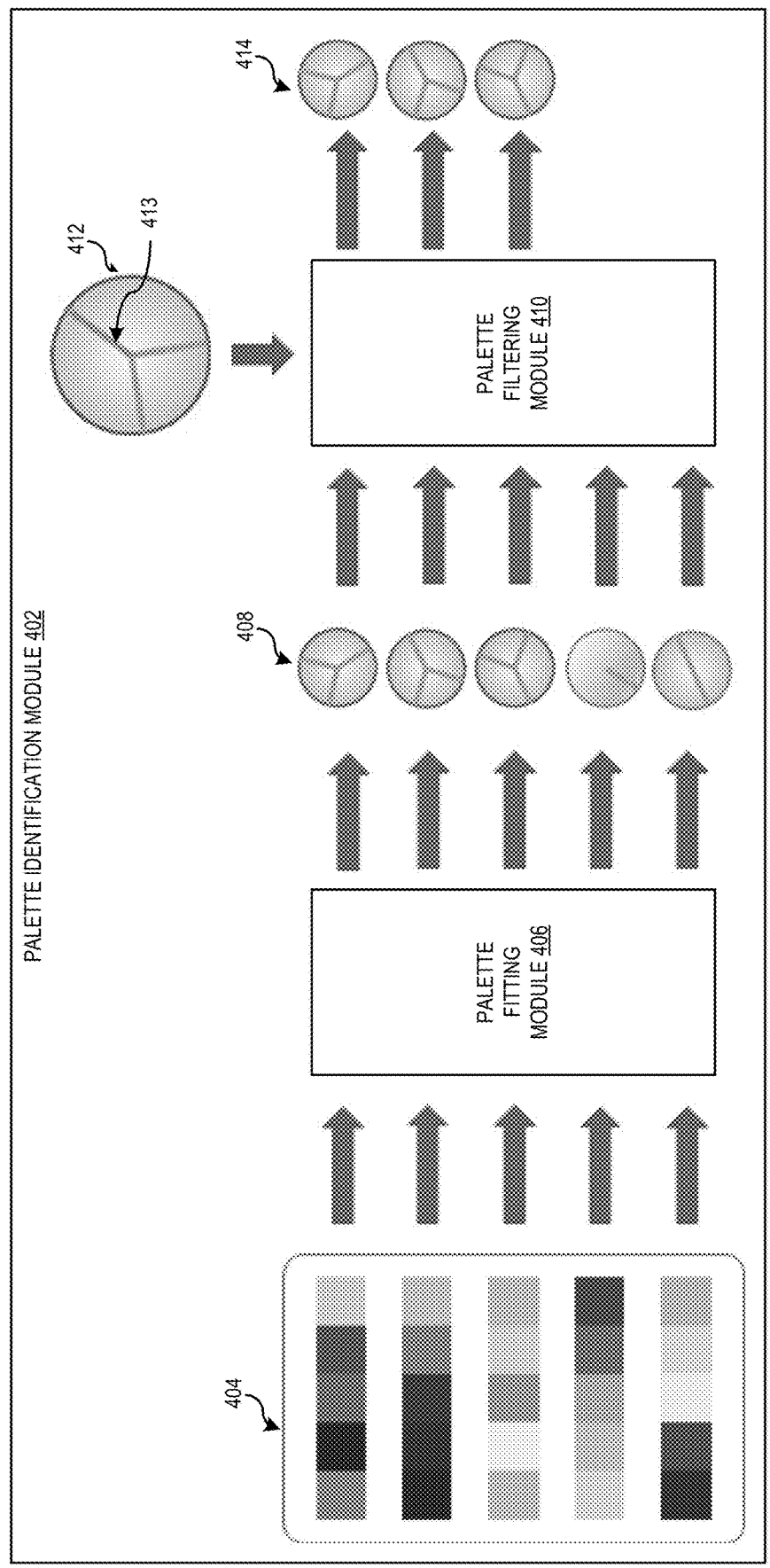
FIG. 4 illustrates a diagram of an example palette identification module in accordance with one or more embodiments.

FIG. 4 illustrates a diagram of an example palette identification module in accordance with one or more embodiments. In FIG. 4, a palette identification module 402 includes a palette fitting module 406 and a palette filtering module 410. In other embodiments, the palette identification module 402 includes more or fewer modules than illustrated in FIG. 4.

As illustrated in FIG. 4, the palette identification module 402 retrieves a plurality of color themes 404. In one embodiment, the palette identification module 402 retrieves the plurality of color themes 404 from a database or storage manager. In one embodiment, the palette identification module 402 retrieves the plurality of color themes 404 from a curated database. For example, the plurality of color themes 404 includes the M color themes having the highest ratings (e.g., based on scores or a user ranking) or being the most frequently used.

As illustrated in FIG. 4, each of the plurality of color themes 404 is a color palette of five colors. In other embodiments, each of the plurality of color themes 404 can include a greater or a fewer number of colors. In one or more embodiments, the plurality of color themes 404 are provided as inputs to the palette fitting module 406. The palette fitting module 406 fits each of the plurality of color themes 404 into one of the plurality of harmonic templates described previously, resulting in the plurality of fitted templates 408.

In one or more embodiments, in addition to determining the harmonic template for each of the plurality of color themes 404, the palette fitting module 406 also determines a configuration for each of the fitted templates 408, including the angle of its primary axis.

As illustrated in FIG. 4, after each of the plurality of color themes 404 are fitted to one of the plurality of harmonic templates, the information is provided as input to the palette filtering module 410. The palette filtering module 410 can also receive fitted template 412 having a primary axis 413. As illustrated in FIG. 4, fitted template 412 and primary axis 413 correspond to fitted template 312 and primary axis 314, respectively. In one or more embodiments, the palette filtering module 410 filters the plurality of color themes 404 by comparing the plurality of fitted templates 408 with the fitted template 412. Continuing the example of FIG. 3, because the fitted template 412 is triadic, the palette filtering module 410 can filter out all of color themes in the plurality of color themes 404 that are not of the triadic type, resulting in the filtered set of color themes 414.

Figure 5:
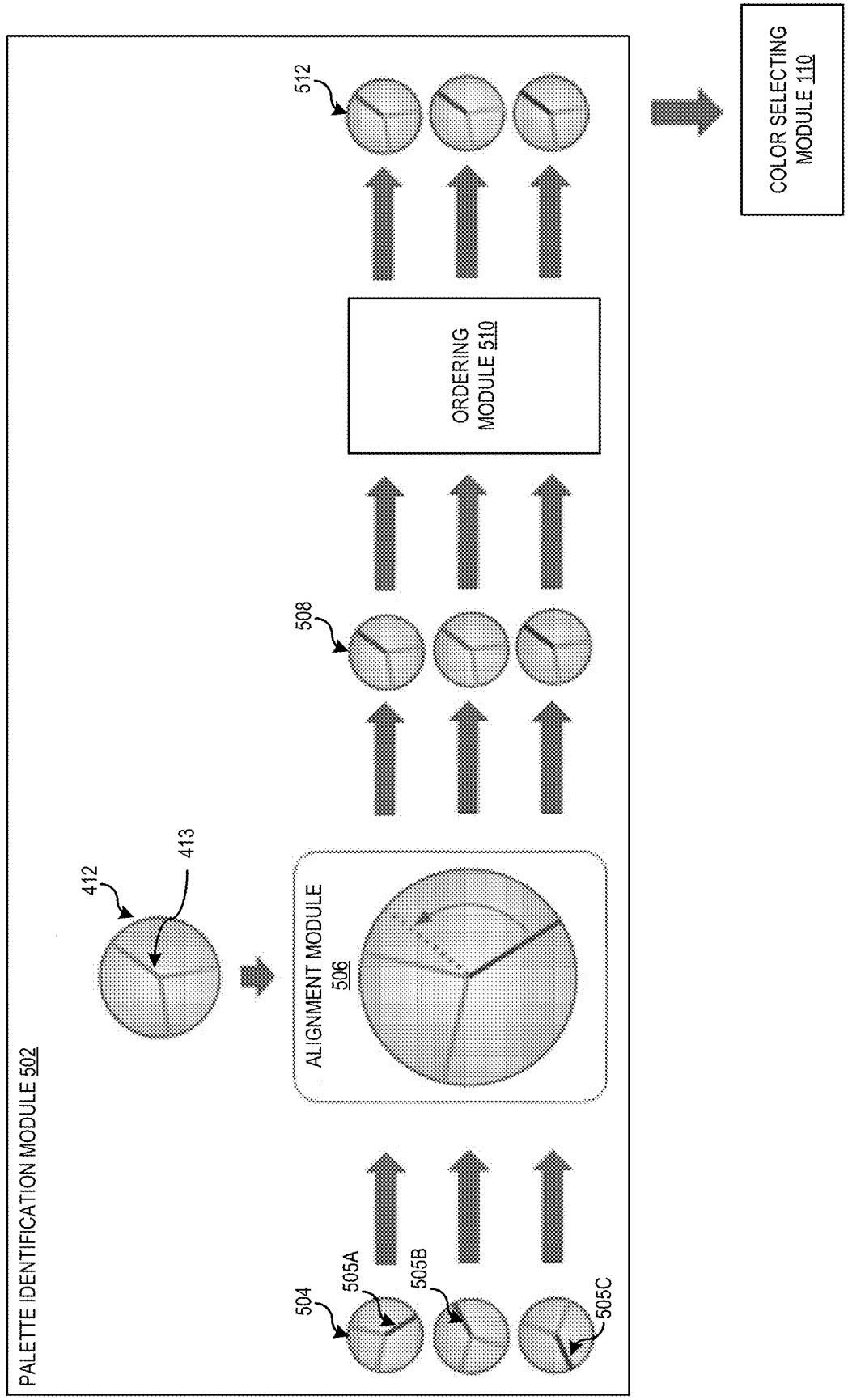
FIG. 5 illustrates a diagram of an example palette identification module in accordance with one or more embodiments.

FIG. 5 illustrates a diagram of an example palette identification module in accordance with one or more embodiments. The palette identification module 502 includes additional modules in addition to those illustrated in FIG. 4. As illustrated in FIG. 5, a palette identification module 502 includes an alignment module 506 and an ordering module 510. In other embodiments, the palette identification module 502 includes more or fewer modules than illustrated in FIG. 5.

As illustrated in FIG. 5, each color theme in the filtered set of color themes 504 includes a primary axis (e.g., labels 505A-C). Continuing the example of FIG. 3, the alignment module 506 adapts the filtered set of color themes 504 by rotating the palette in hue, chroma, and lightness (HCL) space. For example, the alignment module 506 aligns the primary axes 505A-C of the filtered set of color themes 504 based on the angle of the primary axis 413 of the fitted template 412 of the image 300. For example, the alignment module 506 rotates any of the primary axis 505A-C of the filtered set of color themes 504 that have angle values different from the primary axis 413 of the fitted template 412. In one or more embodiments, the output of the alignment module 506 is the set of aligned color themes 508.

In some embodiments, the rotation performed by the alignment module 506 the global rotation in HCL can push some colors out of gamut, causing a display or any other reproduction system to show the colors incorrectly. In such situations, the alignment module 506 projects the colors back into sRGB by clamping their RGB values to the range of [0,1] when converting from HCL to sRGB.

In some embodiments, when the fitted template 412 of the image 300 was determined to be fitted to either the monochrome and analogous harmonic template, the alignment module 506 can generate additional variety in the set of aligned color themes 508 by aligning the primary axis of some of the filtered set of color themes 504 by 90 degrees (to identify accent colors) or 180 degrees (to identify complementary colors) with respect to the primary axis for the fitted template 412 of the image 300.

The ordering module 510 can then receive the set of aligned color themes 508. In one or more embodiments, the ordering module 510 calculates the amount of rotation (e.g., the number of degrees) that was applied to each color theme in the filtered set of color themes 504 to align the primary axes. In one or more embodiments, the ordering module 510 calculates sorts the set of aligned color themes 508 based on the amount of rotation of the primary axis to match the angle of the primary axis 413 of the image 300, resulting in sorted color themes 512. In one or more embodiments, for complementary and axis colors, the sorting criteria is based on an amount of rotation from their corresponding axis. In one or more embodiments, the palette identification module 108 selects some or all of the sorted color themes 512 to send to a color selecting module 110.

Figure 6:
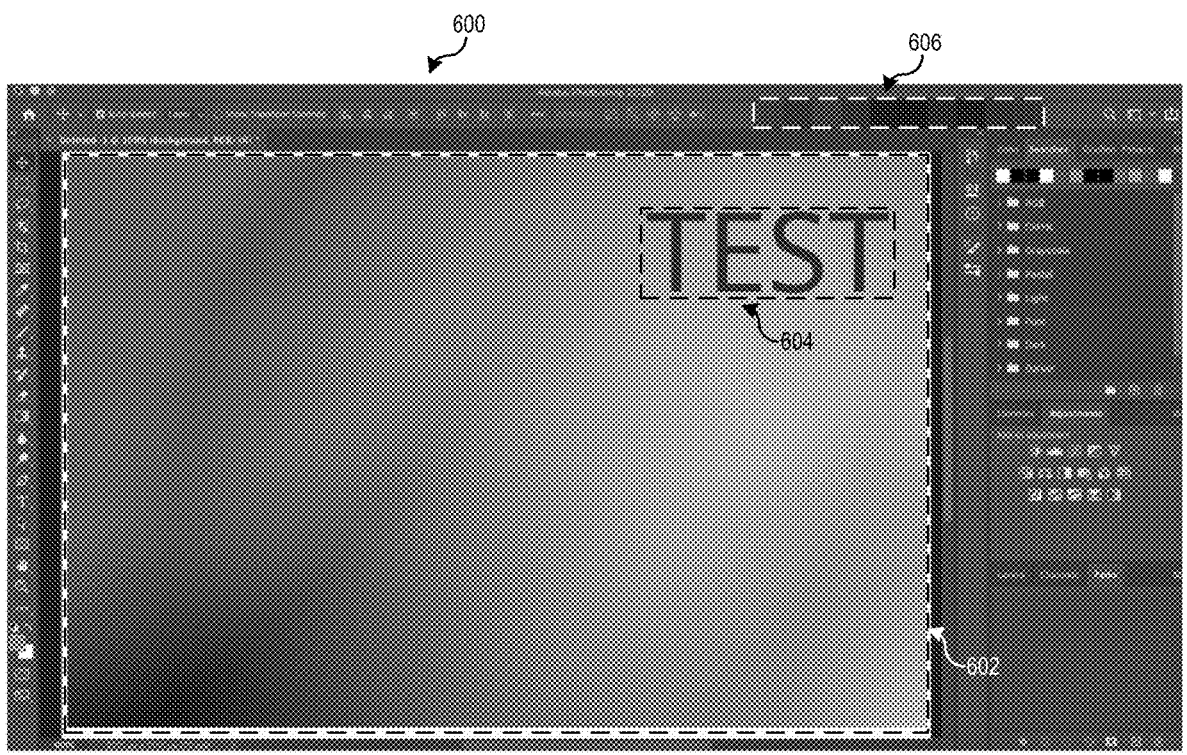
FIG. 6 illustrates example user interfaces showing example outputs of the context-aware text color recommendation system in accordance with one or more embodiments
Figure 6:
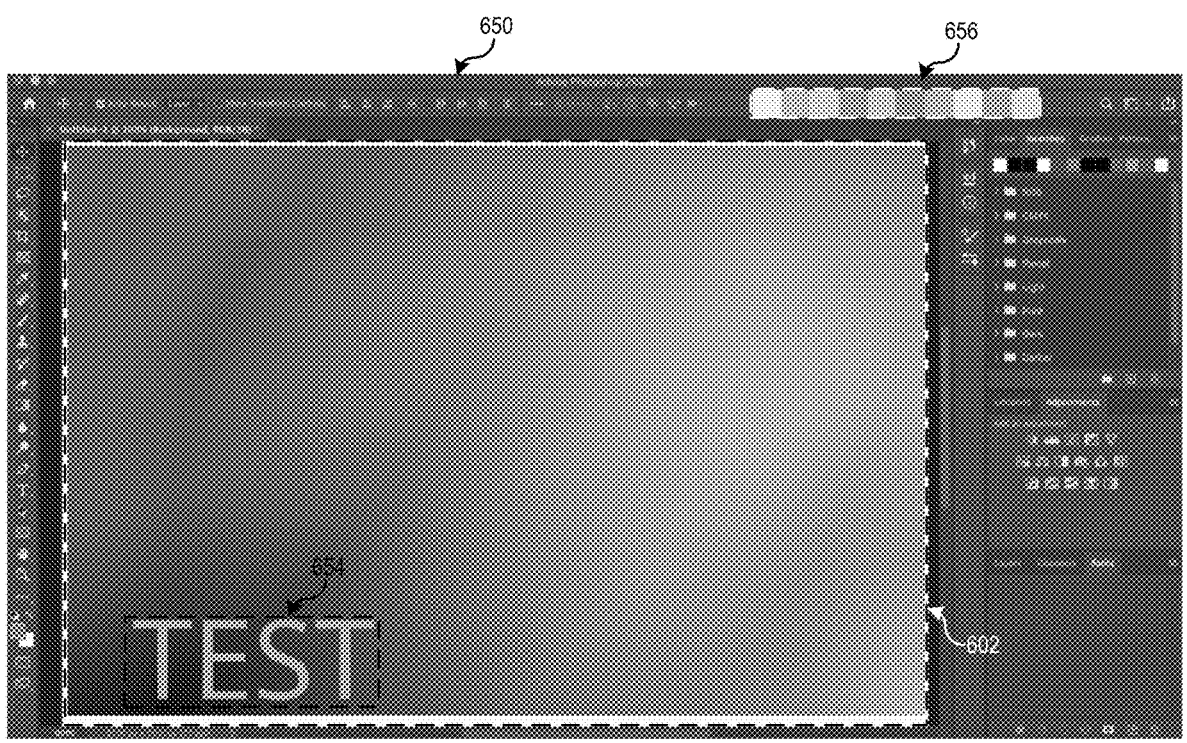

FIG. 6 illustrates example user interfaces showing example outputs of the context-aware text color recommendation system in accordance with one or more embodiments.

As illustrated in FIG. 6, a graphical user interface (GUI) 600 includes an image 602 displayed in an application (e.g., an image processing application). GUI 600 depicts the results provided by a context-aware text color recommendation system 102 in response to receiving the image 602 and receiving a text location 604, as described herein. For example, the context-aware text color recommendation system 102 determines the accessibility for each color in a plurality of filtered color themes, determined to aesthetically match the image, based on the text location on the image. The resulting output is displayed in the GUI 600 as color palette 606. In one or more embodiments, color palette 606 includes a plurality of recommended colors that the context-aware text color recommendation system 102 determined would display text in the text location 604 that both aesthetically match the colors in the in the text location 604 and have accessibility (e.g., be easy to read).

Similarly, GUI 600 depicts the results provided by the context-aware text color recommendation system 102 in response to a user selection of an updated text location 654. For example, in response to a user selecting the updated text location 654 or moving the text from text location 604 to updated text location 654, the context-aware text color recommendation system 102 generated an updated color palette 656. For example, the context-aware text color recommendation system 102 determines the accessibility for each color in the same plurality of filtered color themes based on the updated text location on the image. In one or more embodiments, updated color palette 656 includes a plurality of recommended colors that the context-aware text color recommendation system 102 determined would display text in the updated color palette 656 that both aesthetically match the colors in the image and have accessibility give the updated text location 654. In one or more embodiments, when the text is moved (e.g., from text location 604 to text location 654), the context-aware text color recommendation system 102 automatically updates the text color for the text at text location 654 to one of the colors in updated color palette 656.

Figure 7:
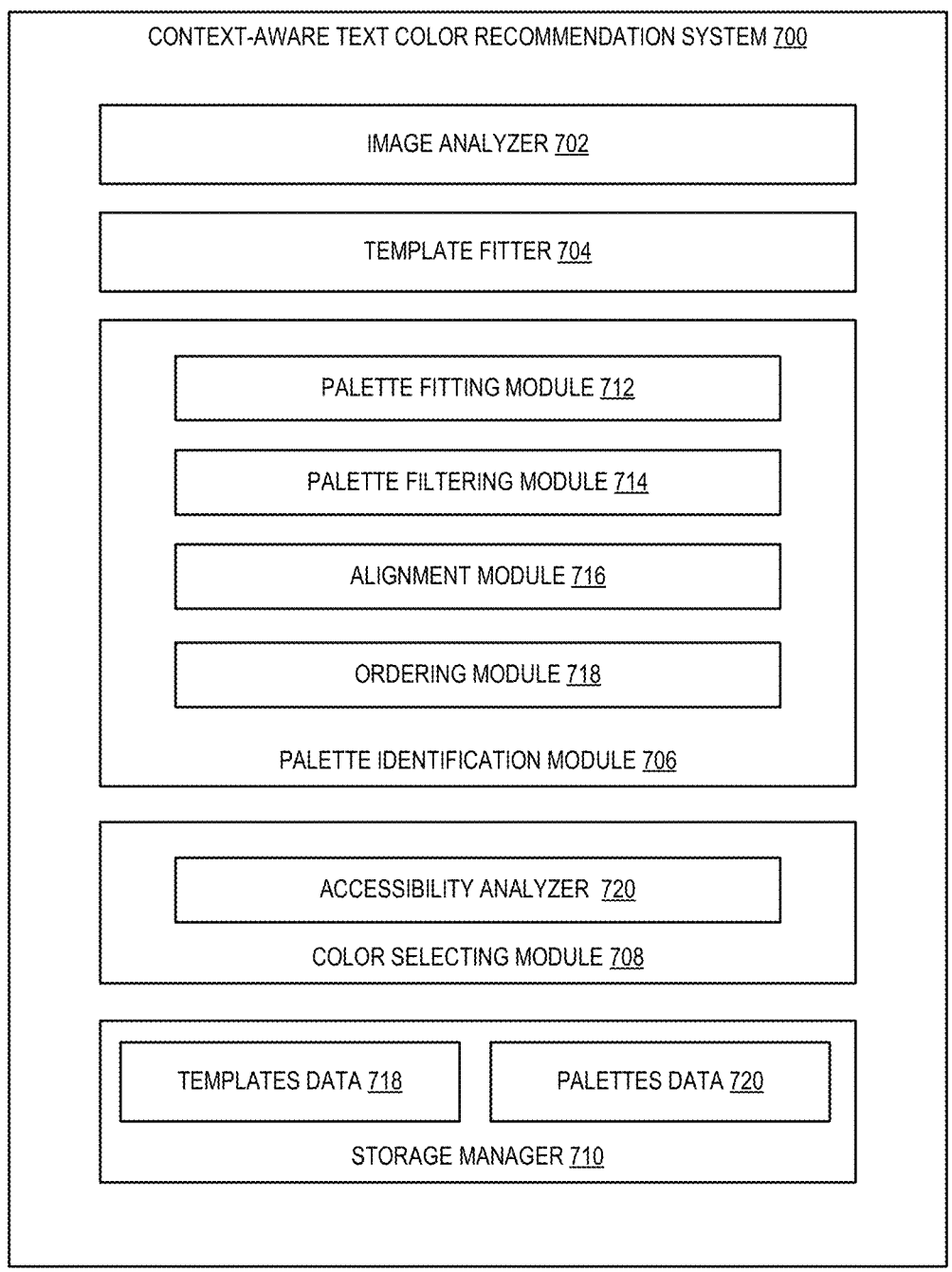
FIG. 7 illustrates a schematic diagram of context-aware text color recommendation system in accordance with one or more embodiments.

FIG. 7 illustrates a schematic diagram of a context-aware text color recommendation system (e.g., "context-aware text color recommendation system" described above) in accordance with one or more embodiments. As shown, the context-aware text color recommendation system 700 may include, but is not limited to, an image analyzer 702, a template fitter 704, a palette identification module 706, and a color selecting module 708. As shown, the palette identification module 706 includes a palette fitting module 712 a palette filtering module 714, and alignment module 716, and an ordering module 718. As shown, the color selecting module 708 includes an accessibility analyzer 720. The storage manager 710 includes templates data 722 and palettes data 724.

As illustrated in FIG. 7, the context-aware text color recommendation system 700 includes an image analyzer 702. The image analyzer 702 can receive or retrieve an image from a computing device. The image analyzer 702 can process the image to generate an image color analysis. In one or more embodiments, the image color analysis is a 3D histogram or a color palette representing the distribution of colors in the received image.

As further illustrated in FIG. 7, the context-aware text color recommendation system 700 also includes a template fitter 704. The template fitter 704 can receive or retrieve the image color analysis for the received image (e.g., from the image analyzer 702). In one or more embodiments, the template fitter 704 determines a fitted template for the image. In one or more embodiments, the template fitter 704 attempts to fit the color distribution of the image to the closest harmonic template of a plurality of harmonic templates. In one embodiment, the template fitter 704 compares or analyzes the color distribution of the image against the following harmonic templates: monochromatic, analogous, complementary, single split, triadic, double split and square. In other embodiments, template fitter 704 distinguishes between a greater or a fewer number of harmonic templates.

As further illustrated in FIG. 7, the context-aware text color recommendation system 700 also includes a palette identification module 706. The palette identification module 706 can include a palette fitting module 712 a palette filtering module 714, and alignment module 716, and an ordering module 718. The palette fitting module 712 can receive or access a plurality of color themes from palettes data (e.g., from storage manager 710). The palette fitting module 712 can then fit each of the plurality of color themes into one of the plurality of harmonic templates described previously, resulting in the plurality of fitted templates. The palette filtering module 714 can then filter the plurality of fitted templates by comparing the plurality of fitted templates with the fitted template for the received image to generate a filtered set of color themes.

The filtered set of color themes can then be passed through the alignment module 716 to align the primary axis of each color theme in the filtered set of color themes to the primary axis of the fitted template for the received image, generating a set of aligned color themes. The ordering module 718 can then order the set of aligned color themes based on the amount of rotation that was needed to align the color theme with the fitted template for the image. The palette identification module 706 can select some or all of the sorted (or ordered) color themes As further illustrated in FIG. 7, the context-aware text color recommendation system 700 also includes a color selecting module 708. The color selecting module 708 can include an accessibility analyzer 720. In one or more embodiments, the color selecting module 708 receive a text location (e.g., from a user computing device) that indicates a location on the received image that the user has selected for the placement of text over the image. In one or more embodiments, the color selecting module 110 generates a color palette recommendation for text at the text location, based on the received text location 128 and a plurality of color themes in the sorted color themes, as described above.

As illustrated in FIG. 7, the context-aware text color recommendation system 700 also includes the storage manager 710. The storage manager 710 maintains data for the context-aware text color recommendation system 700. The storage manager 710 can maintain data of any type, size, or kind as necessary to perform the functions of the context-aware text color recommendation system 700. The storage manager 710, as shown in FIG. 7, includes the templates data 722. The templates data 722 can include data for each of a plurality of harmonic templates (e.g., monochromatic, analogous, complementary, single split, triadic, double split and square) that the template fitter 704 can use to determine a fitted template for a received image, as discussed in additional detail above.

As further illustrated in FIG. 7, the storage manager 710 also includes palettes data 724. For example, the palettes data 724 can include a plurality of color themes that can be used by the palette identification module to identify one or more color themes that aesthetically match a received image.

Each of the components 702-710 of the context-aware text color recommendation system 700 and their corresponding elements (as shown in FIG. 7) may be in communication with one another using any suitable communication technologies. It will be recognized that although components 702-710 and their corresponding elements are shown to be separate in FIG. 7, any of components 702-710 and their corresponding elements may be combined into fewer components, such as into a single facility or module, divided into more components, or configured into different components as may serve a particular embodiment.

The components 702-710 and their corresponding elements can comprise software, hardware, or both. For example, the components 702-710 and their corresponding elements can comprise one or more instructions stored on a computer-readable storage medium and executable by processors of one or more computing devices. When executed by the one or more processors, the computer-executable instructions of the context-aware text color recommendation system 700 can cause a client device and/or a server device to perform the methods described herein. Alternatively, the components 702-710 and their corresponding elements can comprise hardware, such as a special purpose processing device to perform a certain function or group of functions. Additionally, the components 702-710 and their corresponding elements can comprise a combination of computer-executable instructions and hardware.

Furthermore, the components 702-710 of the context-aware text color recommendation system 700 may, for example, be implemented as one or more stand-alone applications, as one or more modules of an application, as one or more plug-ins, as one or more library functions or functions that may be called by other applications, and/or as a cloud-computing model. Thus, the components 702-710 of the context-aware text color recommendation system 700 may be implemented as a stand-alone application, such as a desktop or mobile application. Furthermore, the components 702-710 of the context-aware text color recommendation system 700 may be implemented as one or more web-based applications hosted on a remote server. Alternatively, or additionally, the components of the context-aware text color recommendation system 700 may be implemented in a suit of mobile device applications or "apps." To illustrate, the components of the context-aware text color recommendation system 700 may be implemented in a document processing application or an image processing application, including but not limited to ADOBE® Acrobat, ADOBE® Photoshop, and ADOBE® Illustrator. "ADOBE®" is either a registered trademark or trademark of Adobe Inc. in the United States and/or other countries.

Figure 8:
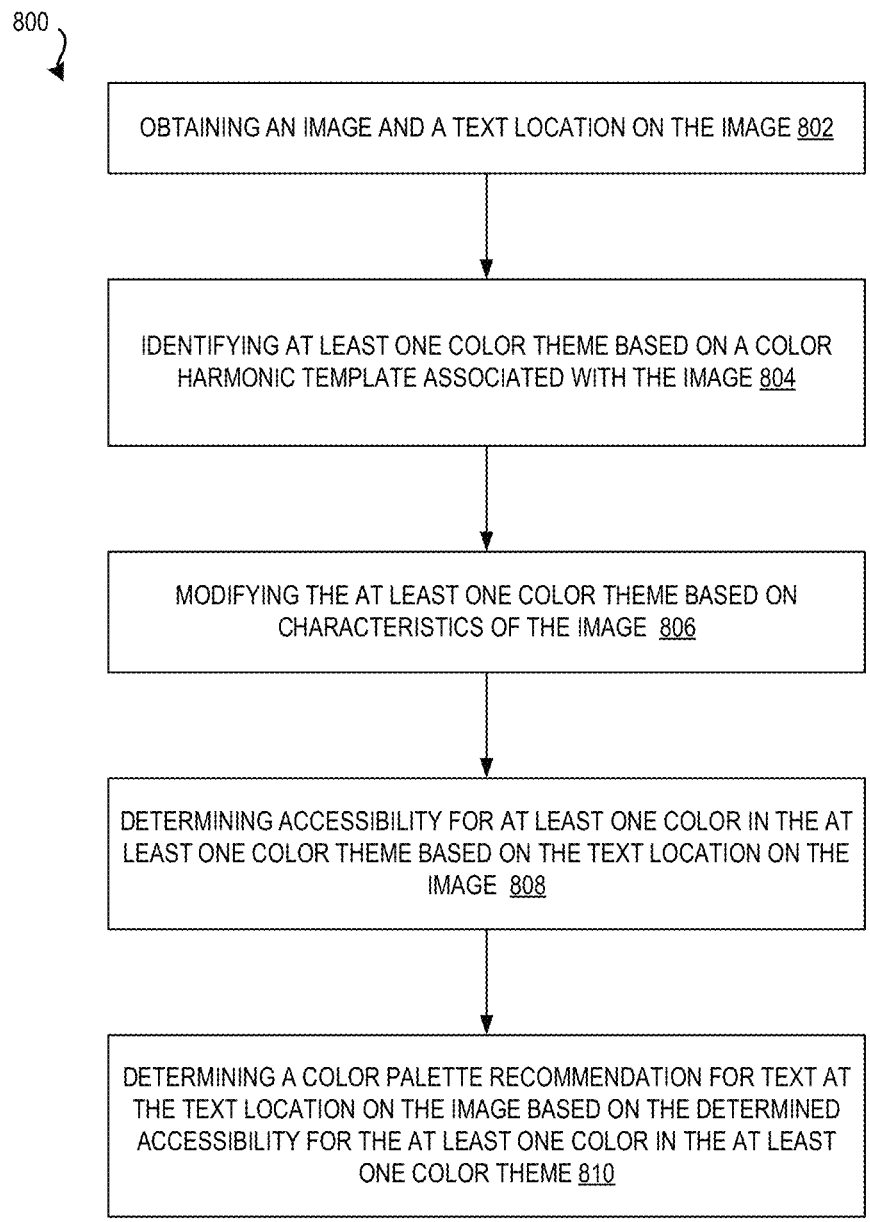
FIG. 8 illustrates a flowchart of a series of acts in a method of determining a context-aware text color recommendation in accordance with one or more embodiments.

FIGS. 1-7, the corresponding text, and the examples, provide a number of different systems and devices that allows a context-aware text color recommendation system to determine a recommended color palette based on a received image and a text location on the image. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of determining a context-aware text color recommendation in accordance with one or more embodiments. In one or more embodiments, the method 800 is performed in a digital medium environment that includes the context-aware text color recommendation system 700. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of obtaining an image and a text location on the image. For example, the context-aware text color recommendation system can receive the image from a user (e.g., via a computing device). A user may select an image in a document processing application or an image processing application, or the user may submit an image to a web service or an application configured to receive images as inputs. In one or more embodiments, the context-aware text color recommendation system can receive the image and the text location prior to performing additional steps in the method 800. In other embodiments, the context-aware text color recommendation system receives the text location subsequent to receiving the image and performing additional steps in the method 800.

As shown in FIG. 8, the method 800 also includes an act 804 of identifying at least one color theme based on a color harmonic template associated with the image. In one or more embodiments, identifying the at least one color theme based on the color harmonic template associated with the image includes filtering a plurality of color themes to identify a plurality of filtered color themes based on the color harmonic template associated with the image. In one or more embodiments, the context-aware text color recommendation system filters the plurality of color themes based on an image color analysis of the image. For example, using a representation of the distribution of colors in the image, the context-aware text color recommendation system determines a harmonic template that most closely matches the distribution of colors in the image. After determining the appropriate harmonic template, the context-aware text color recommendation system determines a plurality of color themes (e.g., color palettes) that are of the same harmonic template as the image.

As shown in FIG. 8, the method 800 also includes an act 806 of modifying the at least one color theme based on characteristics of the image. In one or more embodiments, modifying the at least one color theme based on characteristics of the image includes determining an angle of a primary axis of the image based on the color harmonic template associated with the image (e.g., determined from the image color analysis). In such embodiments, the context-aware text color recommendation system then rotates the primary axis of the at least one color theme to match the angle of the primary axis of the image.

As shown in FIG. 8, the method 800 also includes an act 808 of determining accessibility for at least one color in the at least one color theme based on the text location on the image. In one or more embodiments, the context-aware text color recommendation system computes a luminance of the image at the text location. Further, the context-aware text color recommendation system can compute a luminance for the at least one color in the at least one color theme. The luminance computed for the at least one color can then be compared to the luminance of the image at the text location to compute a contrast ratio for the at least one color.

As shown in FIG. 8, the method 800 also includes an act 810 of determining a color palette recommendation for text at the text location on the image based on the determined accessibility for the at least color in the at least one color theme. For example, the context-aware text color recommendation system selects one or more colors having contrast ratios above a target contrast ratio. In one or more embodiments, the context-aware text color recommendation system selects a subset of the colors determined to be accessible. For example, the X colors with the highest contrast ratios above the target contrast ratio can be selected for the color palette recommendation. The color palette recommendation can then be provided to the requesting computing device. For example, the color palette recommendation can be presented on a user interface on the requesting computing device.

Figure 9:
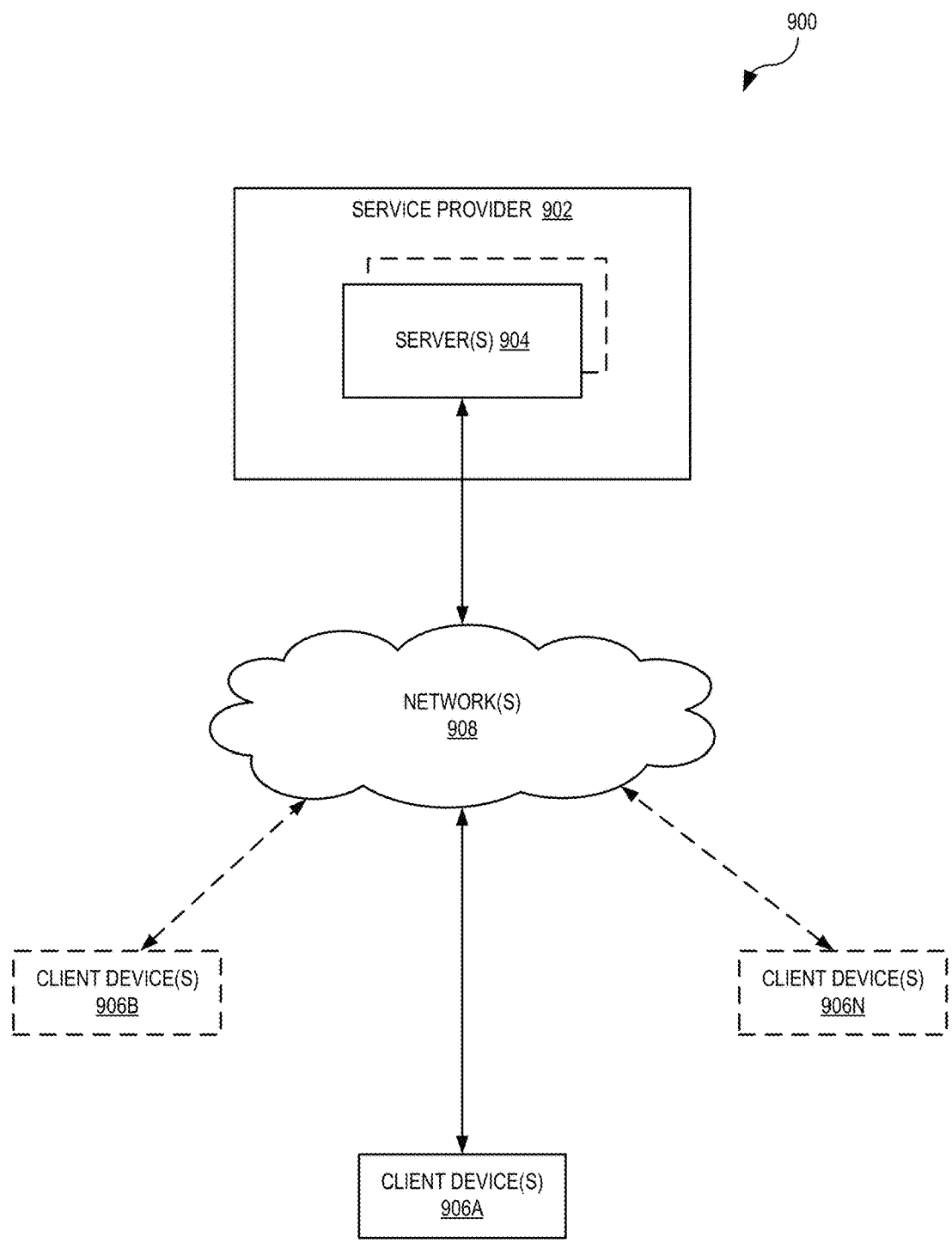
FIG. 9 illustrates a schematic diagram of an exemplary environment in which the context-aware text color recommendation system can operate in accordance with one or more embodiments.

FIG. 9 illustrates a schematic diagram of an exemplary environment 900 in which the context-aware text color recommendation system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the context-aware text color recommendation system 700. In particular, the context-aware text color recommendation system 700 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including templates data 722, palettes data 724, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the context-aware text color recommendation system 700. In particular, the context-aware text color recommendation system 700 can comprise an application running on the one or more servers 904 or a portion of the context-aware text color recommendation system 700 can be downloaded from the one or more servers 904. For example, the context-aware text color recommendation system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide a user of the client device 906A with an interface to provide an image file or a document including an image, or an interface to select a portion of a document including an image. In one or more embodiments, the one or more servers 904 can further provide a user of the client device 906A with an interface to provide a text location on the image. Upon receiving the image and the text location, the one or more servers 904 can automatically perform the methods and processes described above to determine a recommended color palette for text at the text location on the image. The one or more servers 904 can provide an output including the recommended color palette to the client device 906A for display to the user.

As just described, the context-aware text color recommendation system 700 may be implemented in whole, or in part, by the individual elements 902-908 of the environment 900. It will be appreciated that although certain components of the context-aware text color recommendation system 700 are described in the previous examples with regard to particular elements of the environment 900, various alternative implementations are possible. For instance, in one or more embodiments, the context-aware text color recommendation system 700 is implemented on any of the client devices 906A-N. Similarly, in one or more embodiments, the context-aware text color recommendation system 700 may be implemented on the one or more servers 904. Moreover, different components and functions of the context-aware text color recommendation system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
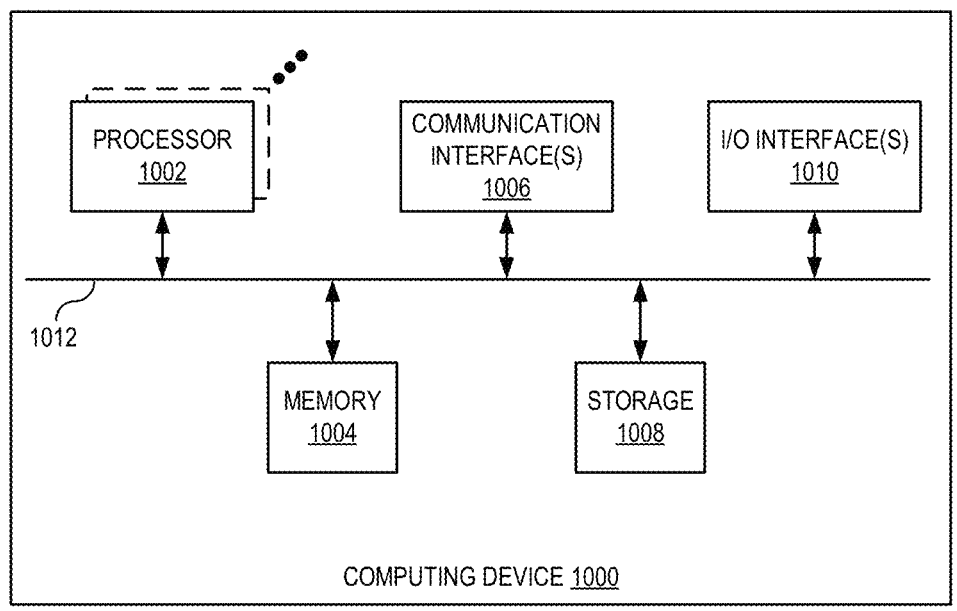
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the image processing system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
obtaining an image and a text location on the image;
identifying at least one color theme based on a color harmonic template associated with the image;
modifying the at least one color theme based on characteristics of the image;
determining accessibility for at least one color in the at least one color theme based on the text location on the image by computing a contrast ratio between a luminance of the image at the text location and a luminance of the at least one color; and
determining a color palette recommendation for text at the text location on the image based on the determined accessibility for the at least one color in the at least one color theme.

2. The computer-implemented method of claim 1, further comprising:
generating an image color analysis for the image, the image color analysis indicating a distribution of colors in the image;
determining the color harmonic template associated with the image based on the image color analysis; and
matching the distribution of colors in the image to one of a plurality of color harmonic templates.

3. The computer-implemented method of claim 2, wherein modifying the at least one color theme based on characteristics of the image further comprises:
determining an angle of a primary axis of the image based on the color harmonic template associated with the image; and
rotating a primary axis of the at least one color theme to match the angle of the primary axis of the image.

4. The computer-implemented method of claim 2, wherein determining the accessibility for the at least one color in the at least one color theme based on the text location on the image further comprises:
computing a luminance of the image at the text location; and
computing a luminance of the at least one color.

5. The computer-implemented method of claim 4, wherein determining the color palette recommendation based on the determined accessibility for the at least one color in the at least one color theme further comprises:
selecting the at least one color for the color palette recommendation when the computed contrast ratio is above a target contrast ratio.

6. The computer-implemented method of claim 1, further comprising:
obtaining an updated text location on the image;
determining the accessibility for the at least one color in the at least one color theme based on the updated text location on the image;
determining an updated color palette recommendation based on the determined accessibility for the at least one color in the at least one color theme; and
automatically applying a color from the updated color palette to the text in the updated text location.

7. The computer-implemented method of claim 1, further comprising:
determining that the image at the text location is highly textured when a measured standard deviation of a luminance of pixels of the image at the text location is above a threshold amount; and
in response to determining that the image at the text location is highly textured, determining a color palette recommendation for a solid color plate for placement on the image at the text location based on the determined color palette recommendation for text.

8. A non-transitory computer-readable storage medium including instructions stored thereon which, when executed by at least one processor, cause the at least one processor to:
obtain an image and a text location on the image;
identify at least one color theme based on a color harmonic template associated with the image;
modify the at least one color theme based on characteristics of the image;
determine accessibility for at least one color in the at least one color theme based on the text location on the image by computing a contrast ratio between a luminance of the image at the text location and a luminance of the at least one color; and determine a color palette recommendation for text at the text location on the image based on the determined accessibility for the at least one color in the at least one color theme.

9. The non-transitory computer-readable storage medium of claim 8, further comprising:
generating an image color analysis for the image, the image color analysis indicating a distribution of colors in the image;
determining the color harmonic template associated with the image based on the image color analysis; and
matching the distribution of colors in the image to one of a plurality of color harmonic templates.

10. The non-transitory computer-readable storage medium of claim 9, wherein modifying the at least one color theme based on characteristics of the image further comprises:
determining an angle of a primary axis of the image based on the color harmonic template associated with the image; and
rotating a primary axis of the at least one color theme to match the angle of the primary axis of the image.

11. The non-transitory computer-readable storage medium of claim 9, wherein determining the accessibility for the at least one color in the at least one color theme based on the text location on the image further comprises:
computing a luminance of the image at the text location; and
computing a luminance of the at least one color.

12. The non-transitory computer-readable storage medium of claim 11, wherein determining the color palette recommendation based on the determined accessibility for the at least one color in the at least one color theme further comprises:
selecting the at least one color for the color palette recommendation when the computed contrast ratio is above a target contrast ratio.

13. The non-transitory computer-readable storage medium of claim 8, further comprising:
obtaining an updated text location on the image;
determining the accessibility for the at least one color in the at least one color theme based on the updated text location on the image;
determining an updated color palette recommendation based on the determined accessibility for the at least one color in the at least one color theme; and
automatically applying a color from the updated color palette to the text in the updated text location.

14. The non-transitory computer-readable storage medium of claim 8, further comprising:
outputting the color palette recommendation for display in a user interface.

15. A system, comprising:
a computing device including a memory and at least one processor, the computing device implementing a context-aware text color recommendation system,
wherein the memory includes instructions stored thereon which, when executed, cause the context-aware text color recommendation system to:
obtain an image and a text location on the image;
identify at least one color theme based on a color harmonic template associated with the image;
modify the at least one color theme based on characteristics of the image;
determine accessibility for at least one color in the at least one color theme based on the text location on the image by computing a contrast ratio between a luminance of the image at the text location and a luminance of the at least one color; and
determine a color palette recommendation for text at the text location on the image based on the determined accessibility for the at least one color in the at least one color theme.

16. The system of claim 15, wherein the instructions further cause the context-aware text color recommendation system to:
generate an image color analysis for the image, the image color analysis indicating a distribution of colors in the image;
determine the color harmonic template associated with the image based on the image color analysis; and
match the distribution of colors in the image to one of a plurality of color harmonic templates.

17. The system of claim 16, wherein the instructions to modify the at least one color theme based on characteristics of the image, when executed, further causes the context-aware text color recommendation system to:
determine an angle of a primary axis of the image based on the color harmonic template associated with the image; and
rotate a primary axis of the at least one color theme to match the angle of the primary axis of the image.

18. The system of claim 16, wherein the instructions to determine the accessibility for the at least one color in the at least one color theme based on the text location on the image, when executed, further causes the context-aware text color recommendation system to:
compute a luminance of the image at the text location; and
compute a luminance of the at least one color.

19. The system of claim 18, wherein the instructions to determine the color palette recommendation based on the determined accessibility for the at least one color in the at least one color theme, when executed, further causes the context-aware text color recommendation system to:
select the at least one color for the color palette recommendation when the computed contrast ratio is above a target contrast ratio.

20. The system of claim 15, wherein the instructions further cause the context-aware text color recommendation system to:
obtain an updated text location on the image;
determine the accessibility for the at least one color in the at least one color theme based on the updated text location on the image;
determine an updated color palette recommendation based on the determined accessibility for the at least one color in the at least one color theme; and
automatically apply a color from the updated color palette to the text in the updated text location.

* * * * *